United States Patent [19]

Inoue et al.

[11] Patent Number: 4,977,396

[45] Date of Patent: Dec. 11, 1990

[54] MACHINING PARAMETER SELECTIVE SETTING DISPLAY APPARATUS FOR ELECTROEROSION MACHINES

[75] Inventors: Kiyoshi Inoue, Tokyo; Akihiko Shimizu, Kanagawa, both of Japan

[73] Assignee: Inoue Japax Incorporated, Kawasakishi, Japan

[21] Appl. No.: 501,300

[22] Filed: Jun. 6, 1983

[30] Foreign Application Priority Data

Apr. 2, 1982 [JP] Japan .................................. 57-53744

[51] Int. Cl.⁵ .............................................. G09G 5/00
[52] U.S. Cl. ..................................... 340/706; 340/711
[58] Field of Search ............... 340/793, 802, 711, 712, 340/825.19, 706, 700

[56] References Cited

U.S. PATENT DOCUMENTS

| | | | |
|---|---|---|---|
| 3,806,911 | 4/1974 | Pripusich | 340/802 |
| 4,180,812 | 12/1979 | Kaltenbach et al. | 340/706 |
| 4,247,845 | 1/1981 | Schmidt et al. | 340/802 |
| 4,327,994 | 5/1982 | Barley et al. | 340/711 |
| 4,372,054 | 2/1983 | Pomerantz et al. | 340/802 |
| 4,421,418 | 12/1983 | Morishima | 340/712 |
| 4,446,456 | 5/1984 | Beier | 340/706 |
| 4,454,501 | 6/1984 | Butts | 340/711 |
| 4,464,933 | 8/1984 | Santis | 340/712 |
| 4,476,462 | 10/1984 | Feldman | 340/711 |

Primary Examiner—Alvin E. Oberley
Assistant Examiner—Richard Hjerpe
Attorney, Agent, or Firm—Herbert Dubno

[57] ABSTRACT

A machining parameter selective setting display apparatus for use with an electroerosion machine comprises a parameter-selection panel, parameter selection pushbuttons, a numerical display panel and numerical selection push-buttons, all on a single frame or base member. The parameter-selection panel has a plurality of divided surface portions which bear different indicia representing respective different electroerosion machining parameters, and are arranged in a predetermined ordered array. The parameter selection pushbuttons are used to allow the operator of the machine to itemize the machining parameters successively and are depressed to successively highlight the indicia-bearing portions for the parameter itemization. Upon each such itemization, the numerical selection push-buttons are operated to allow the operator to select a desired value for the itemized machining parameter in conjunction with the display panel successively displaying a set of numerical values for the operator selection.

2 Claims, 1 Drawing Sheet

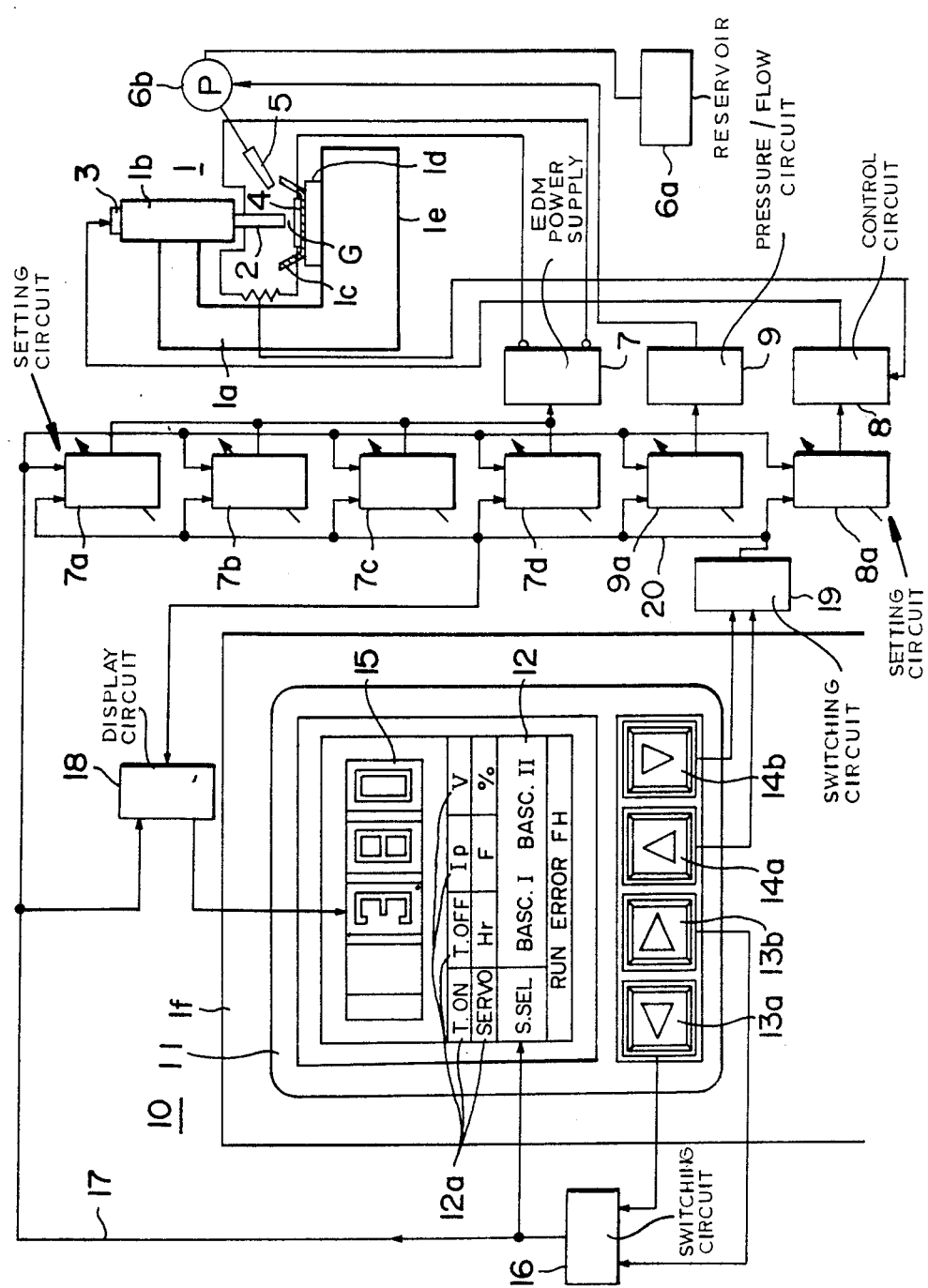

MACHINING PARAMETER SELECTIVE SETTING DISPLAY APPARATUS FOR ELECTROEROSION MACHINES

FIELD OF THE INVENTION

The present invention relates to a machine-operator's aid for electroerosion machining operations and, more particularly, to a machining parameter selective setting display apparatus for use with an electroerosion machine.

BACKGROUND OF THE INVENTION

In the electroerosion machining process, a variety of machining parameters, e.g. the pulse on-time Ton, off-time Toff, peak voltage V and current magnitude Ip of successive electroerosive pulses to be applied between a tool electrode and a workpiece, and the pressure or flow rate of a machining fluid to be supplied into a machining gap, must be taken into account, in conjunction with the particular electrode and workpiece materials selected, to establish a particular set of prescribed machining conditions, namely removal rate, surface finish, overcut and relative electrode wear. A standard electroerosion machine is thus equipped with a set of different settings for each machining parameter which are adjusted by the operator to make the machine run in a manner such as to yield the particular end results desired.

Most existing electroerosion machines are equipped with a control panel thereon having a number of dials, knobs and push-buttons each or each set of which is provided independently of others for the operator's independent adjustments of the various machining parameters. Indicia, displays and like visual indications are provided individually for each of these independent adjustment aids. It is apparent that such existing setting display means are subject to maladjustments and need considerable experience on the part of the operator to use them free of error.

OBJECTS OF THE INVENTION

The present invention seeks to provide a novel machining parameter selective setting display apparatus which can be used easily by an unskilled or unexperienced operator for an electroerosion machine to allow the operator to establish required settings for all relevant machining parameters sequentially without fail.

SUMMARY OF THE INVENTION

The present invention provides a machining parameter selective setting display apparatus for use with an electroerosion machine, which apparatus comprises: a base member; a parameter selection panel on the base member, having a plurality of divided surface portions or segments which bear different indicia representing a same plurality of different electroerosion machining parameters, respectively, and are arranged in a predetermined ordered array so that the segments represent different electroerosion parameters which are arranged in the predetermined array; parameter selection switch means on the base member, operatively associated with the said indicia-bearing portions on the panel and manually operable by an operator of the electroerosion machine for his/her successive itemization of the different machining parameters, the said switch means being operable, upon the operator's actuation thereof related to the itemization of each particular machining parameter, to provide a visibly distinguishing presentation for the particular one of the said indicia-bearing portions whose indicia represents the itemized particular machining parameter; a numeral display panel on the base member; and numeral selection switch means on the base member, operatively associated with the display panel and manually actuatable by the operator for his/her selection of a particular one of different numerical values predetermined in a set for each of the said itemizable machining parameters, the numeral selection switch means being operable, upon the operator's actuation thereof related to his/her selection of the said particular numerical value for the itemized machining parameter, to provide a visual display of the selected particular numerical value on the display panel.

Preferably, the parameter selection switch means comprises a pair of push-buttons associated with switching circuit means, the latter being operatively connected with the said indicia-bearing portions so as to cause the visually distinguishing presentation to be shifted in one of two opposite directions in the predetermined opposite directions in the predetermined order of the array, i.e. along the array in one longitudinal direction thereof, when one of the push-buttons is depressed, and to cause the said visually distinguishing presentation to be shifted towards the other of the two directions when the other of the push-buttons is depressed. Advantageously the said one and other push-buttons bear indicia representing the one and other directions, respectively.

Preferably, the numeral selection switch means comprises a pair of push-buttons associated with switching circuit means, the latter being operatively connected with the display panel so as to cause the said preset numeral values displayed on the display panel to be altered in a value-increasing direction when one of the push-buttons is depressed, and to cause said preset numerical values on the display panel to be altered in a value-decreasing direction when the other of said push-buttons is depressed. Advantageously the said one and other push-buttons bear indicia representing the value-increasing and value-decreasing directions, respectively.

BRIEF DESCRIPTION OF THE DRAWING

These and other features of the present invention as well as advantages thereof will become more readily apparent from the following description when taken with reference to the accompanying drawing in which the sole FIGURE is a schematic view diagrammatically illustrating an apparatus according to the invention.

SPECIFIC DESCRIPTION

Referring now to the drawing, there is shown an electroerosion machining parameter selective setting display apparatus 10 according to the present invention for use with an electroerosion machine designated at 1 and illustrated schematically.

The machine 1 is shown in the form of a ram-type EDM machine having a frame 1a which carries a ram 1b from which a tool electrode 2 depends as vertically displaceable by a servo motor 3 disposed on the ram 1b. A workpiece 4 is securely mounted in a worktank 1c which is displaceable horizontally with a worktable 1d on a bed portion 1e of the frame 1a. A nozzle 5 is shown directed towards an EDM gap formed between the tool electrode 2 and the workpiece 4 to draw a machining liquid from a reservoir 6a by means of a pump 6b. An EDM power supply 7 is electrically connected with the tool electrode 2 and the workpiece 4 to supply a succession of EDM voltage pulses between them across a machining gap G. A succession of electrical discharges or current pulses is passed through the liquid-flooded machining gap G to electroerosively remove stock from the workpiece 4. Parameters of EDM pulses, e.g. peak voltage V, current magnitude Ip, on-time Ton and off-time Toff are adjustably set at setting circuits 7a, 7b, 7c and 7d in the EDM power supply 7. As machining proceeds, the motor 3 is controlledly driven by a control circuit 8 to controlledly advance the tool electrode 2 towards and away from the workpiece 4. The servo reference level for the electrode advance and retraction is adjustably set in the circuit 8. The pressure or flow rate of the machining liquid is adjustably set in a circuit 9 operatively coupled with the pump 6a.

The parameter selective setting display apparatus 10 includes a base member or frame 11 which may be constructed to be operable for hand carriage by an operator of the machine 1. Alternatively, the frame 11 may be mounted on the frame 1a of the machine 1 or a separate control unit or console 1f containing setting circuits 7a–7d, 8a and 9a of the circuit units 7, 8 and 9. The apparatus 10 is also formed on the frame 11 with an indicia-bearing panel 12, a first pair of push-buttons 13a and 13b, a second pair of push-buttons 14a and 14b, and a display panel 15.

The panel 12 has a plurality of divided surface portions 12a bearing different indicia such as T.ON, T.OFF. Ip, V, SERVO and F which represent the pulse on-time Ton, the pulse off-time Toff, the pulse current magnitude, the pulse peak voltage, the servo reference level and the fluid pressure, respectively, as typical EDM machining parameters. Further indicia as shown to represent other pertinent parameters may also be marked on the panel 12. Prior to a given machining operation, the operator is required to itemize the indicia-represented machining parameters to give a proper numerical setting for each of them. The indicia-bearing divided surface portions 12a are arranged in a predetermined ordered array.

The push-buttons 13a, 13b are manually depressable by the operator and provided to light or provide a visually distinguishing presentation for, one of these indicia-bearing portions 2a. The push-button 13a with an arrow marking directed towards the left-hand side is depressed to shift the visually distinguishing presentation or the light (segment illumination) backwards in the ordered array on the panel 12. The push-button 13b with an arrow marking directed towards the right-hand side is depressed to shift the visually distinguishing presentation or the light forwards in the ordered array on the panel 12. Thus, the indicia-bearing surface portions 12a are provided with their individual lighting terminals which are energized by a switching circuit 16 that operates with depressions of the push-buttons 13a, 13b. The switching circuit 16 may be designed to allow a shift by one segment of the illumination each time the respective push-button 13a, 13b is depressed, or alternatively when the depression is continued for more than a predetermined time duration. In this manner, the operator can itemize the machining parameters successively and is assured of the selection of each itemization from the lighted indicia-bearing portion 12a.

Concurrently with lighting the indicia (12a) representing the particular machining parameter itemized, the switching circuit 16 issues a command signal along a line 17 to the corresponding setting circuit 7a, 7b, 7c, 7d, 8a, 9a in the control unit 7, 8, 9 so that a desired selection can be made among multiple presettings therein. The circuit 7a is provided with a set of settings for the pulse on-time Ton. The circuit 7b is provide with a set of settings for the pulse off-time Toff. The circuit 7c is provided with a set of settings for the pulse current magnitude Ip. The circuit 7d is provided with a set of settings for the pulse peak voltage V. The circuit 8a is provided with a set of settings for the servo reference voltage. The circuit 9a is provided with a set of settings for the pressure or flow rate of the machining liquid supplied into the machining gap.

The push-buttons 14a, 14b are also manually depressable by the operator and provided to allow him/her to select a desired numerical value for his/her itemized machining parameter.

The display panel 15 is provided to allow the operator by depressing the push-buttons 14a, 14b to display and confirm his/her selected numerical value for each itemized machining parameter. The panel 15 is provided with a conventional display circuit 18, which is here designed to respond to the parameter itemization signal incoming from the switching circuit 16 along the line 17 to establish therein a set of settings for numerical values corresponding to the settings established in the itemized machining parameter setting circuit, 7a–7d, 8a, 9a. The display circuit 18 is connected via a switching circuit 19 to the push-buttons 14a, 14b. The switching circuit 19 is actuated responsive to depressions of the push-buttons 14a, 14b to furnish along a line 20 a command signal which is applied on one hand to the display circuit 18 and on the other hand to one of the setting circuits 7a–9a which is for the machining parameter itemized by the command signal from the switching circuit 19.

The push-button 14a with an arrow marking directed upwards is depressed to alter the numerical value displayed on the panel 15 in the value-increasing directions. The pushbutton 14b with an arrow marking directed downwards is depressed to alter the numerical value displayed on the panel 15 in the value-decreasing direction. The command signal provided from the switching circuit 19 responsive to the depression of the push-button, 14a, 14b and applied to the display circuit 18 to cause it to display the particular numerical value on the panel is also applied to the corresponding setting circuit 7a, . . . . . , 9a of the machining parameter itemized.

There is thus provided a novel machining parameter selective setting display apparatus for use with an electroerosion machine, which apparatus can be used easily by an unskilled or unexperienced operator for the machine to allow him/her to establish required settings for all relevant machining parameters sequentially without fail.

What is claimed is:

1. The combination of a machining parameter selective setting display apparatus with an electroerosion machine adapted to have its parameters set by the apparatus, said apparatus comprising:
   a frame;
   a parameter selection panel enclosed in said frame having segments representing different electroerosion machining parameters which are arranged in a predetermined array;

parameter selection switch means on said frame operatively associated with said segments on said panel and manually actuatable by an operator of the electroerosion machine for successive operator selection of said different machining parameters, said switch means being operable, upon the operator's each particular selection-related actuation thereof, to produce a switching signal to provide a visibly distinguishing presentation for the particular one of said segments whose visibly distinguishing presentation represents the selected particular machining parameter;

a numeral display panel on said frame; and a numeral selection switch means on said frame, operatively associated with said numeral display panel and manually actuatable by the operator for selection of a particular one of different numerical values in a predetermined set for each of said selected machining parameters, said numeral selection switch means being so coupled to said machine as to select particular machining parameters of electroerosion and being operable, upon the operator's actuation thereof related to selection of the particular numerical value for the particular selected machining parameter, to provide a visual display of the selected particular numerical value on said numeral display panel, said parameter selection switch means comprising a pair of push-buttons associated with switching circuit means, the latter being operatively connected with said segments so as to shift said visually distinguishing presentation towards one of two opposite directions in which said segments are oriented in said array when one of said push-buttons is depressed, and to shift said visually distinguishing presentations towards the other of said two directions when the other of said push-buttons is depressed, said one of the push-buttons being provided with indicia representing said one and other directions, respectively.

2. The combination of a machining parameter selective setting display apparatus with an electroerosion machine adapted to have its parameters set by the apparatus, said apparatus comprising:

a frame;

a parameter selection panel enclosed in said frame having segments representing different electroerosion machining parameters which are arranged in a predetermined array;

parameter selection switch means on said frame operatively associated with said segments on said panel and manually actuatable by an operator of the electroerosion machine for successive operator selection of said different machining parameters, said switch means being operable, upon the operator's each particular selection-related actuation thereof, to produce a switching signal to provide a visibly distinguishing presentation for the particular one of said segments whose visibly distinguishing presentation represents the selected particular machining parameter;

a numeral display panel on said frame; and a numeral selection switch means on said frame, operatively associated with said numeral display panel and manually actuatable by the operator for selection of a particular one of different numerical values in a predetermined set for each of said selected machining parameters, said numeral selection switch means being so coupled to said machine as to select particular machining parameters of electroerosion and being operable, upon the operator's actuation thereof related to selection of the particular numerical value for the particular selected machining parameter, to provide a visual display of the selected particular numerical value on said numeral display panel, said parameter selection switch means comprising a pair of bush-buttons associated with first switching means, the latter being operatively connected with said segments so as to shift said visually distinguishing presentation towards one of two opposite directions in which said segments are oriented in said array when one of said push-buttons is depressed, and to shift said visually distinguishing presentations toward the other of said two directions when the other of said push-buttons is depressed, said one and other push-buttons of the first pair being provided with indicia representing said one and other directions, respectively, and said numeral selection switch means comprising a second pair of push-buttons associated with second switching circuit means, the latter being operatively connected with said numeral display panel so as to shift the present numerical values displayed on said display panel to increase the preset numerical values when one of the push-buttons of the second pair is depressed, and to shift said numerical values on the display panel to decrease the preset numerical values when the other of said push-buttons is depressed, said one and other push-buttons of the second pair having indicia representing, respectively, whether the push button increases or decreases the numerical value.

* * * * *